Patented Aug. 3, 1948

2,446,464

UNITED STATES PATENT OFFICE 2,446,464

BETA,GAMMA-ALKENYL ETHERS OF GLYCEROL, AND ESTERS THEREOF

Theodore W. Evans, Oakland, and Donald S. Meistrom, Berkeley, Calif., assignors to Shell Development Company, San Francisco, Calif., a corporation of Delaware No Drawing. Application October 30, 1944, Serial No. 561,148

7 Claims. (Cl. 260—488)

This invention relates to derivatives of trihydric alcohols having three contiguous carbinol groups, wherein one of the hydroxy groups of the trihydric alcohol has been replaced by a 2,4,5-trihalophenoxy radical, and to processes for their production.

More particularly, the invention relates to derivatives of the glycerols wherein one of the hydroxy groups has been replaced by a 2,4,5-trihalophenoxy radical, and each of the remaining hydroxy groups has been replaced by the same or different members of the group consisting of the halogen atoms, the carboxylic acid radicals, the hydroxy group, the hydrocarbyloxy radicals and the halohydrocarbyloxy radicals, or both of the remaining hydroxy groups have been replaced by the same oxygen atom. The compounds embraced in this group may be represented by the following formulae

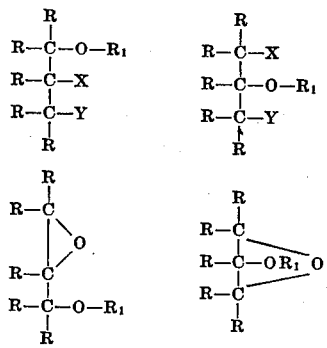

wherein $R_1$ is a 2,4,5-trihalophenyl radical, the R's may be the same or different and represent members of the group consisting of the hydrogen atom, the hydrocarbon radicals, and the halohydrocarbon radicals, and X and Y may be the same or different members of the group consisting of the halogen atoms, the carboxylic acid radicals, the hydroxy group, the hydrocarbyloxy radicals and the halohydrocarbyloxy radicals. The glycerol ethers and the derivatives thereof to which the invention relates include the 2,4,5-trihalophenyl ethers of the glycerol mono- and dihydrocarbyl ethers, of the glycerol mono- and dihalohydrins, of the glycerol mono- and diesters of the carboxylic acids, of the glycerol monoether monoesters of carboxylic acids, of the glycerol monoether monohalohydrins, of the monohalohydrin monoesters of carboxylic acids, and of the glycidols.

A particularly valuable group of the compounds to which the invention relates comprises those derivatives of the glycerols wherein one of the hydroxy groups has been replaced by a 2,4,5-trihalophenoxy radical, another hydroxy group has been replaced by a hydrocarbyloxy radicals, preferably an alloxy-type radical, and the third hydroxy group has been replaced by a member of the group consisting of the halogen atoms, the carboxylic acid radicals, the hydroxy group, the hydrocarbyloxy radicals and the halohydrocarbyloxy radicals; and more particularly those compounds which may be represented by the formula

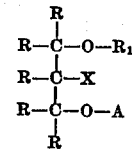

wherein R is the hydrogen atom, a hydrocarbon radical or a halohydrocarbon radical, $R_1$ is a 2,4,5-trihalophenyl radical, A is an allyl-type radical, and X is a member of the group consisting of the halogen atoms, the carboxylic acid radicals, the hydroxy group, the hydrocarbyloxy radicals and the halohydrocarbyloxy radicals.

An object of the invention is to provide glycerol (2,4,5-trihalophenyl) ethers and derivatives thereof which have value as solvents, diluents, modifying agents and as processing agents in the textile industry, and which also serve as intermediates in the syntheses of valuable organic products, as reagents and/or additives in the formation of synthetic resins, plastics and synthetic rubbers, as insecticides, fungicides, parasiticides or as constituents of insecticidal, fungicidal and parasiticidal compositions, etc. They may also be useful as humectants and emulsifying agents, etc. The glycerol (2,4,5-trihalophenyl) ethers and derivatives thereof are particularly valuable as softeners and plasticizers for natural and synthetic resins, plastics and synthetic rubbers because of their extremely low volatility and low inflammability. A further object of the invention is to provide methods for the preparation of the glycerol derivatives of the class herein disclosed.

The halogen substituents of the 2,4,5-trihalophenyl radical which $R_1$ represents may all be the same or different and may be any halogen atoms, particularly the chlorine, bromine or iodine atoms. Examples of suitable 2,4,5-trihalophenyl radicals are 2,4,5-trichlorophenyl, 2,4,5-tribromophenyl, 2,4,5-triiodophenyl, 2,4-dichloro-5-bromophenyl, 2-chloro-4,5-dibromophenyl, 2,5-dichloro-4-bromophenyl, and the like.

The term "hydrocarbyloxy radicals" as used throughout the specification and in the claims is to be understood to mean those radicals comprising a hydrocarbon radical directly attached by a single bond to an oxygen atom which has the one remaining bond free. The hydrocarbyloxy radicals may be represented by the formula, —OR, wherein R is a hydrocarbon radical which may be saturated or unsaturated, cyclic or acyclic, and include the alkoxy radicals such as methoxy, ethoxy, propoxy, isopropoxy, butoxy, isobutoxy, pentoxy, hexoxy; and the aryloxy radicals such as phenoxy; the alkenoxy radicals such as vinoxy, alloxy, methalloxy, crotoxy, butadienoxy; the cycloalkoxy radicals such as cyclohexoxy, cyclopentoxy; as well as the aralkoxy, the aralkenoxy, and the cycloalkenoxy radicals and the like and their homologues and analogues. Correspondingly, the term "halohydrocarbyloxy radicals" means those radicals represented by the formula, —OR wherein R is a halohydrocarbyl radical. Representative of the halohydrocarbyloxy radicals are chloromethoxy, chloroethoxy, chlorobutoxy, chlorophenoxy, dichlorobutoxy, 2,4,5-trichlorophenoxy, 2,4,5-tribromophenoxy, and the like and their homologues and analogues.

The alloxy-type radicals comprise those radicals wherein an oxygen atom having one free bond is attached directly by the other bond to a saturated carbon atom which is linked directly by a single bond to an olefinic linkage between two carbon atoms of aliphatic character, and they may be represented by the formula, —O—A, wherein A is an allyl-type radical. These alloxy-type radicals may alternatively be termed "beta, gamma-alkenoxy" radicals.

The allyl-type radical may be represented by the formula

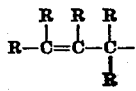

wherein R is a member of the group consisting of the hydrogen atom and the hydrocarbon radicals. In the above formula, the R's are preferably selected from the group consisting of the hydrogen atom and the hydrocarbon radicals of saturated character. It is to be understood that any of the R's may be linked together to form a cyclic radical such as the furfuryl radical. The allyl-type radical is preferably one which is represented by the formula

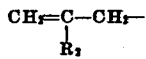

wherein R₂ is a member of the group consisting of the hydrogen atom and the alkyl radicals.

Suitable allyl-type radicals which A may represent include allyl, methallyl, crotyl, ethallyl, tiglyl, furfuryl, cinnamyl, beta-methyl gamma-ethallyl, and the like, and their homologues and analogues.

Representative examples of this one of the preferred groups of the derivatives of glycerol wherein one of the hydroxy groups has been replaced by a 2,4,5-trihalophenoxy radical and wherein another of the hydroxy groups has been replaced by an alloxy-type radical are glycerol alpha-(2,4,5-trichlorophenyl) gamma-allyl ether, glycerol alpha - allyl gamma -(2,4,5 - trichlorophenyl) ether acetate, glycerol alpha-methallyl gamma-(2,4,5 - trichlorophenyl) ether, glycerol alpha - crotyl gamma -(2,4,5 - trichlorophenyl) ether phthalate, glycerol alpha-(2,4,5-tribromophenyl) beta-allyl ether, glycerol alpha-tiglyl beta-(2,4,5-tribromophenyl) ether propionate, glycerol alpha-allyl beta-cinnamyl gamma-(2,4,5-trichlorophenyl) ether, and the like and their homologues and analogues.

X and/or Y may represent halogen atoms such as the bromine, iodine and most particularly the chlorine atoms. If one of X and Y is a halogen atom and the other is the hydroxy group, the compound represented is a 2,4,5-trihalophenyl ether of a glycerol monohalohydrin; and if both of X and Y are halogen atoms, the compound is a 2,4,5-trihalophenyl ether of a glycerol dihalohydrin.

The carboxylic acid radicals which X and/or Y may represent are the mono- or polyvalent radicals derived from the mono- or polyvalent, saturated or unsaturated carboxylic acids by subtracting one or more hydrogen atoms from the carboxyl groups. Examples of suitable carboxylic acid radicals are the formate, acetate, propionate, butyrate, isobutyrate, benzoate, monophthalate, acrylate, diglycollate, trimethyladipate, oxalate, itaconate, maleate, fumarate, adipate, citrate, oleate, stearate, bromostearate, sulfoacetate and bicarbonate radicals, and the like and their homologues. The monovalent radical of a carboxylic acid may also represent the monovalent radical of a polybasic acid which has been esterified or reacted in any or all but one of the acid groups by an alcohol or a basic reacting substance, such as the monomethyloxalate, monoallylphthalate, diallylcitrate, monomethallylitaconate, monocinnamyladipate, monoallyltrimethyladipate, monocrotylitaconate, monoallylitaconate, monosodiumphthalate, mono(glycerol diallyl ether) phthalate radicals, and the like.

Any or all of the R's in the above formulas may be the same or different and represent members of the group consisting of the hydrogen atom, the hydrocarbon radicals and halogen-substituted hydrocarbon radicals. Representative hydrocarbon and halohydrocarbon radicals which R may represent are the alkyl, alkenyl, aryl, cycloalkyl, cycloalkenyl, aralkyl, alkaryl, aralkenyl, alkenaryl, and heterocyclic radicals and their halogen-substituted radicals, such as, for example, methyl, ethyl, propyl, isopropyl, butyl, isobutyl, tertiary butyl, amyl, hexyl, cyclohexyl, cyclohexenyl, vinyl, allyl, butenyl, hexadienyl, benzyl, phenyl, furyl, thiophenyl, dihydroisophoryl, chloromethyl, 2,4,5-trichlorophenyl, 2,4,5-tribromophenyl, and the like and their homologues and analogues. When an R which is directly attached to a glycerol carbon atom is an alkyl radical, the formula represents a 2,4,5-trihalophenyl ether derivative of an alkyl glycerol, e. g. a 2,4,5-trichlorophenyl ether of alpha-methyl glycerol. When X and Y each represents the hydroxyl group, the compound represented by the above formula is either an alpha-(2,4,5-trihalophenyl) monoether of a glycerol, or a beta-(2,4,5-trihalophenyl) monoether of a glycerol; when one of X and Y is a hydrocarbyloxy radical or halogen-substituted hydrocarbyloxy radical, a glycerol diether derivative is represented, and when both X and Y represent hydrocarbyloxy radicals or a halogen-substituted hydrocarbyloxy radical, a glycerol triether is represented. When X and/or Y represents a 2,4,5-trihalophenoxy radical, the above formula represents a glycerol tri(2,4,5-trihalophenyl) ether or a glycerol di(2,4,5-trihalophenyl) ether derivative, e. g. glycerol tri(2,4,5-trichlorophenyl) ether, glycerol alpha,beta-di(2,4,5-trichlorophenyl) ether, etc.

The 2,4,5-trihalophenyl ethers of glycerols and derivatives thereof may be prepared by any suitable known methods. The esters of the glycerol mono- and diethers wherein at least one of the ether groups is a 2,4,5-trihalophenyl radical may be prepared by reacting the mono- or diether with an acid, an acid anhydride or an acid halide under suitable conditions in the presence of a catalyst if necessary, e. g. a few drops of sulfuric acid; for example, glycerol alpha-(2,4,5-trichlorophenyl) ether reacted with glacial acetic acid or acetic anhydride which is preferably in molar excess over the ether in the presence of concentrated sulfuric acid produces glycerol alpha-(2,4,5-trichlorophenyl) ether diacetate. A glycerol 2,4,5-trihalophenyl ether halohydrin may be produced by the reaction of an alpha,beta- or an alpha,gamma-dihalohydrin with sodium hydroxide and the 2,4,5-trihalophenol in an amount sufficient to replace only one of the halogen atoms, or by reaction of a trihalohydrin with sodium hydroxide and the 2,4,5-trihalophenol in an amount sufficient to react with one or two of the halogen atoms of the halohydrin, leaving at least one of the halogen atoms unreacted. Another method for preparing the glycerol ether halohydrins comprises reacting an epihalohydrin with a 2,4,5-trihalophenol in the absence or presence of a catalyst such as a metal halide, e. g. stannic chloride.

The 2,4,5-trihalophenyl ethers of the glycidols may be prepared by the reaction of sodium hydroxide and the corresponding 2,4,5-trihalophenol with a 1,2- or a 1,3-epihalohydrin; or by the dehydration of the corresponding glycerol 2,4,5-trihalophenyl monoether. One method which may be particularly suitable for the preparation of a glycidyl ether comprises reacting the corresponding glycerol 2,4,5-trihalophenyl monoether monohalohydrin with a basic or basic-reacting compound capable of effecting the removal of one mole of hydrogen halide from one mole of the halohydrin ether treated, for example a caustic such as sodium hydroxide. When a glycerol alpha-(2,4,5-trihalophenyl) monoether gamma-monohalohydrin or a glycerol alpha-(2,4,5-trihalophenyl) ether beta-monohalohydrin is treated with caustic, a glycidyl 2,4,5-trihalophenyl ether is produced.

A method which has been found convenient for the preparation of the 2,4,5-trihalophenyl monoethers of the glycerols comprises hydrating the corresponding glycidyl ether or a mixture containing said glycidyl ether, e. g. in the presence of dilute sulfuric acid. Various other methods for the preparation of the glycerol alpha-(2,4,5-trihalophenyl) monoethers include the alkaline hydrolysis of the corresponding monohalohydrin ether. Some of the ethers may also be prepared by the reaction of an epihalohydrin or a glycerol monohalohydrin with a 2,4,5-trihalophenol and powdered sodium hydroxide. Glycerol 2,4,5-trihalophenyl hydrocarbyl diethers may be prepared by reacting powdered sodium hydroxide and an epihalohydrin with a substantial molar excess of a 2,4,5-trihalophenol and then, if a mixed diether is desired, with some other alcohol preferably in the presence of a solvent or homogenizer such as dioxane; diethers may also be prepared by the reaction of a 2,4,5-trihalophenyl ether of a glycerol monohalohydrin with sodium hydroxide and an alcohol or by reaction of a hydrocarbyl ether of a glycerol monohalohydrin with sodium hydroxide and 2,4,5-trihalophenol. One method which has been found particularly suitable for the preparation of glycerol alpha-(2,4,5-trihalophenyl) gamma-hydrocarbyl diethers comprises reacting the corresponding glycidyl trihalophenyl ether with an alcohol which is preferably present in substantial molar excess over the ether, in the presence of a catalyst such as stannic chloride, or by reacting a glycidyl hydrocarbyl ether with a 2,4,5-trihalophenol. If a glycerol di(2,4,5-trihalophenyl) ether is desired, it may be produced by reacting a glycidyl trihalophenyl ether with a 2,4,5-trihalophenol; for example, glycerol alpha,gamma-di(2,4,5-trichlorophenyl) ether may be prepared by reacting glycidyl 2,4,5-trichlorophenyl ether with a substantial molar excess of 2,4,5-trichlorophenol in the presence of stannic chloride.

The following examples serve to illustrate the invention.

*Example I*

A solution of about 208 parts by weight of 2,4,5-trichlorophenol in about 241 parts by weight of methyl isobutyl ketone was heated to about 95° C. and about 45 parts by weight of 97% sodium hydroxide was added. The mixture was stirred at about 95° C. until all the sodium hydroxide had dissolved, requiring about one and one-half hours. Approximately 117 parts by weight of glycerol alpha-monochlorohydrin was added and stirring was continued at about 95° C. to about 100° C. for about one hour. After removal of the sodium chloride by filtration, the filtrate and washings were distilled, giving about a 77% yield of viscous, yellow liquid boiling at 174° C. to 186° C. at 0.5 mm. and comprising the glycerol alpha-(2,4,5-trichlorophenyl) ether, which solidified on standing and was found to have a melting point of 85° C. to 87° C.

*Example II*

A mixture of about 221 parts by weight of glycerol alpha-(2,4,5-trichlorophenyl) ether and about 184 parts by weight of glacial acetic acid was refluxed with about 2.75 parts by weight of concentrated sulfuric acid in the presence of benzene for azeotropic removal of water for approximately three hours. The mixture was treated with about 3 parts by weight of anhydrous sodium carbonate to neutralize sulfuric acid and distilled to produce a yield of about 78% of product, boiling at 180° C. to 190° C. at 1 mm. The crude distillate was a viscous, yellow liquid which solidified on standing. After crystallization from alcohol and a decolorization treatment, the glycerol alpha-(2,4,5-trichlorophenyl) ether diacetate was obtained as a powdery, white solid, melting at 83° C. to 84.5° C.

*Example III*

Approximately 592 parts by weight of 2,4,5-trichlorophenol and about 126 parts by weight of sodium hydroxide pellets (97%) in about 620 parts by weight of dioxane were heated and stirred at about 100° C. for approximately 90 minutes. To this solution was added during 45 minutes about 374 parts by weight of glycerol alpha-monochlorohydrin methyl ether, and the mixture was stirred at about 100° C. for approximately one hour. After filtering off the sodium chloride and washing with acetone, the combined filtrate and washings were distilled and the product was collected at 163.5° C. to 166° C. at 0.5 to 1 mm. in about a 67% yield. After a decolorization treatment and crystallization from petroleum ether containing a small amount of benzene, the glycerol alpha-methyl gamma-(2,4,5-trichlorophenyl) ether was obtained as a white solid melting at 49.5° C. to 51° C.

Example IV

Glycerol alpha-methyl gamma-(2,4,5-trichlorophenyl) ether acetate was prepared by azeotropic removal of water from a mixture of about 208 parts by weight of glycerol alpha-methyl gamma-(2,4,5-trichlorophenyl) ether, about 90 parts by weight of acetic acid, about 1.5 parts by weight of p-toluene-sulfonic acid, and approximately 66 parts by weight of benzene. The esterification was complete in about 4 hours, and the product was distilled at 153° C. to 155° C. at 0.5 mm. and was obtained in about 80% yield. After fractionation the product was very slightly yellow, and had the following physical properties:

| | |
|---|---|
| d 20/4 | 1.3631 |
| n 20/D | 1.534 |

Example V

Glycerol alpha-allyl gamma-(2,4,5-trichlorophenyl) ether was prepared from about 592 parts by weight of 2,4,5-trichlorophenol, about 129 parts by weight of flake sodium hydroxide (95%), and approximately 452 parts by weight of glycerol alpha-monochlorohydrin gamma-allyl ether in about 620 parts by weight of dioxane by essentially the same procedure as that described in Example III. The product was collected by distillation at 163° C. to 174° C. at 0.5 mm. in about a 66% yield. Fractionation gave a very pale yellow cut boiling at 180° C. to 184° C. at 0.5 to 1 mm., and having the following physical properties:

| | |
|---|---|
| d 20/4 | 1.3503 |
| n 20/D | 1.553 |

Example VI

Esterification of about 249 parts by weight of glycerol alpha-allyl gamma-(2,4,5-trichlorophenyl) ether with about 96 parts by weight of glacial acetic acid, using p-toluenesulfonic acid as catalyst and with benzene to remove water, was complete after approximately 5½ hours. Distillation gave an approximately 87% yield of glycerol alpha-allyl gamma-(2,4,5-trichlorophenyl) ether acetate, boiling at 158.5° C. to 165° C. at 0.5 mm. After two fractionations, a colorless heart cut was obtained boiling at 158° C. to 159° C. at 0.5 mm. and having the following physical properties:

| | |
|---|---|
| d 20/4 | 1.3125 |
| n 20/D | 1.532 |

Example VII

Glycerol alpha-(2,4,5-tribromophenyl) ether is prepared by reacting a solution of about 349 parts by weight of 2,4,5-tribromophenol in about 240 parts by weight of methyl isobutyl ketone and about 45 parts by weight of 97% sodium hydroxide according to the procedure described in Example I.

Example VIII

Following the procedure described in Example III, about 988 parts by weight of 2,4,5-tribromophenol is reacted with about 122 parts by weight of flake sodium hydroxide (95%) and approximately 450 parts by weight of glycerol alpha-monochlorohydrin gamma-allyl ether in about 620 parts by weight of dioxane to produce a good yield of glycerol alpha-allyl gamma-(2,4,5-tribromophenyl) ether.

Example IX

Glycerol alpha-(2,4,5-trichlorophenyl) ether gamma-monochlorohydrin may be prepared by reacting 2,4,5-trichlorophenol and epichlorohydrin in a mole ratio of about 3:1 at a temperature of about 90° C. to about 100° C. in the presence of about 0.01 mole of stannic chloride per mole of epichlorohydrin.

Example X

Glycerol alpha-(2,4,5-trichlorophenyl) ether gamma-monochlorohydrin is treated with about a 25% aqueous sodium hydroxide solution at about 80° C. to about 90° C. for approximately four hours to produce glycidyl 2,4,5-trichlorophenyl ether.

By obvious modifications of the procedures described in the above examples, there may be prepared various other glycerol 2,4,5-trihalophenyl ethers and derivatives thereof such as glycerol beta-(2,4,5-trichlorophenyl) ether, glycerol alpha-(2,4-dichloro 5-bromophenyl) ether, glycerol alpha,gamma-di(2,4,5-trichlorophenyl) ether, glycerol tri-(2,4,5-trichlorophenyl) ether; glycerol alpha-methallyl gamma - (2,4,5 - tribromophenyl) ether, glycerol alpha-ethyl beta-(2,4,5-trichlorophenyl) ether, glycerol alpha-crotyl beta-propyl gamma-(2,4,5-tribromophenyl) ether; glycidyl 2,4,5-tribromophenyl ether; glycerol alpha-(2,4,5-tribromophenyl) ether gamma-monochlorohydrin, glycerol alpha-(2,4,5-trichlorophenyl) ether gamma-monobromohydrin, glycerol alpha-allyl beta-(2,4,5-trichlorophenyl) ether gamma-monochlorohydrin, glycerol beta-(2,4,5-trichlorophenyl) gamma-monochlorohydrin, glycerol alpha-(2,4-dichloro 5-bromophenyl) ether gamma-monochlorohydrin; glycerol alpha,gamma-di-(2,4,5-trichlorophenyl ether monoacetate, glycerol alpha - (2,4,5 - trichlorophenyl) gamma - crotyl ether monopropionate, glycerol alpha-(2,4,5-tribromophenyl) ether diacrylate, glycerol alpha-allyl gamma-(2,4,5-trichlorophenyl) ether phthalate; and the like and their homologues and analogues.

We claim as our invention:

1. Glycerol alpha-allyl gamma-(2,4,5-trichlorophenyl) ether.
2. Glycerol alpha-allyl gamma-(2,4,5-trichlorophenyl) ether acetate.
3. Glycerol alpha-(2,4,5-trichlorophenyl ether diacetate.
4. An unsubstituted fatty acid ester of glycerol (2,4,5-trichlorophenyl) ether.
5. A derivative of glycerol wherein one of the hydroxy groups has been replaced by a 2,4,5-trihalophenoxy radical, and at least one of the remaining hydroxy groups has been replaced by an acyloxy radical of an unsubstituted hydrocarbon-containing carboxylic acid, any hydroxy groups not so replaced being retained as such.
6. A beta,gamma-alkenyl ether of glycerol (2,4,5-trichlorophenyl) ether.
7. A derivative of glycerol wherein one of the hydroxy groups has been replaced by a 2,4,5-trihalophenoxy radical, and one of the remaining hydroxy groups has been replaced by a beta,gamma-alkenoxy radical, the remaining hydroxy group being retained as such.

THEODORE W. EVANS.
DONALD S. MELSTROM.

(References on following page)

REFERENCES CITED

The following references are of record in the file of this patent:

UNITED STATES PATENTS

| Number | Name | Date |
|---|---|---|
| Re. 22,347 | Evans | July 13, 1943 |
| 2,130,990 | Coleman | Sept. 20, 1938 |
| 2,161,937 | Scott | June 13, 1939 |
| 2,221,771 | Alquist | Nov. 19, 1940 |
| 2,335,813 | Stein | Nov. 30, 1943 |
| 2,343,053 | Grun | Feb. 29, 1944 |
| 2,351,024 | Evans | July 13, 1944 |
| 2,351,025 | Marple | July 13, 1944 |
| 2,401,261 | MacMullen | May 28, 1946 |
| 2,975,018 | Bruson | Mar. 30, 1937 |

FOREIGN PATENTS

| Number | Country | Date |
|---|---|---|
| 219,325 | Germany | Feb. 23, 1910 |

OTHER REFERENCES

Marle: "Journal Chem. Soc. (London)," vol. 101, pages 305–317.

Rossing: "Berichte," vol. 19, page 65.